July 1, 1930.  J. ZUBATY  1,769,281
ELECTRIC TRANSMISSION
Filed July 2, 1926  4 Sheets-Sheet 2
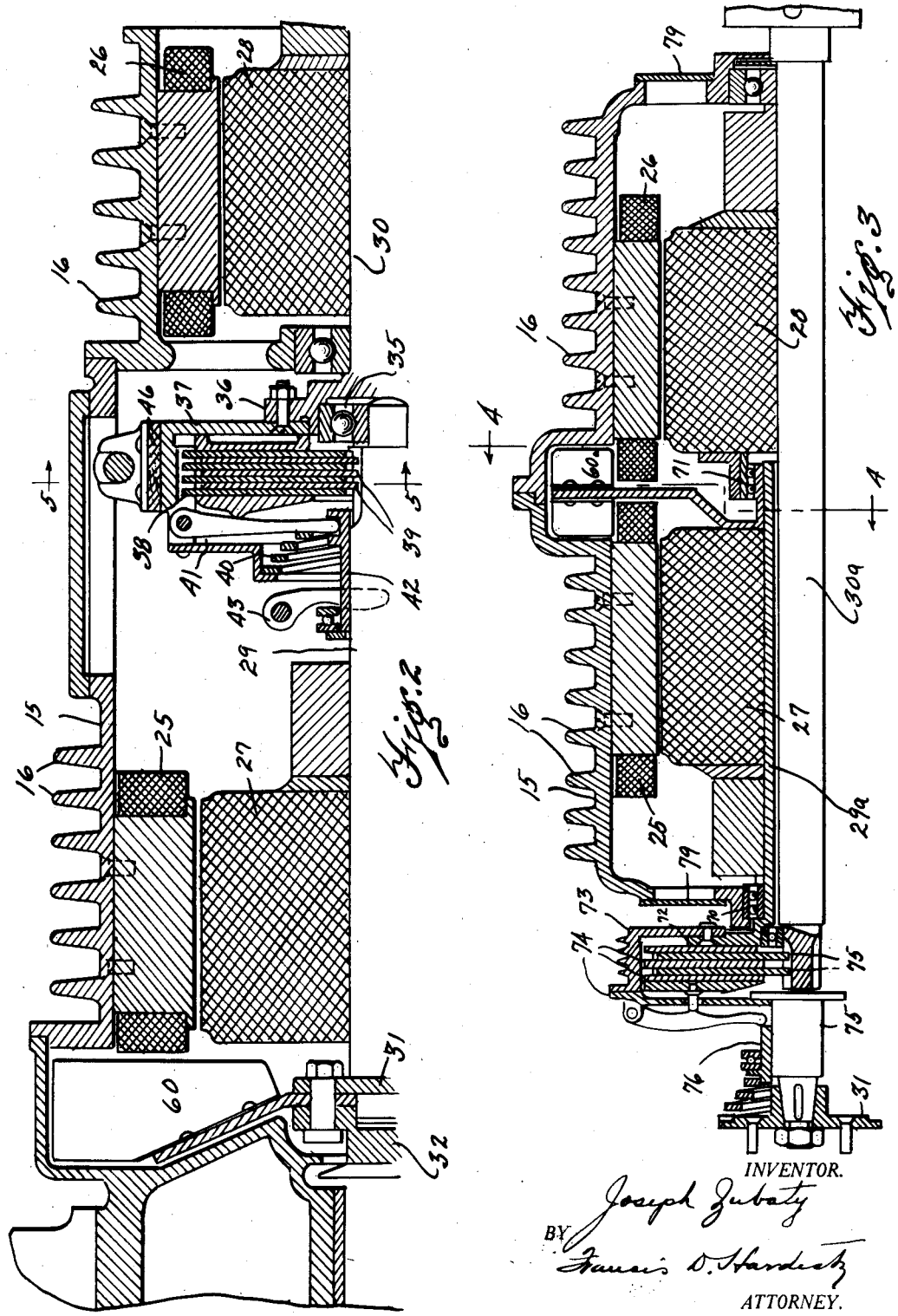
INVENTOR.
Joseph Zubaty
BY
Francis D. Hardesty
ATTORNEY.

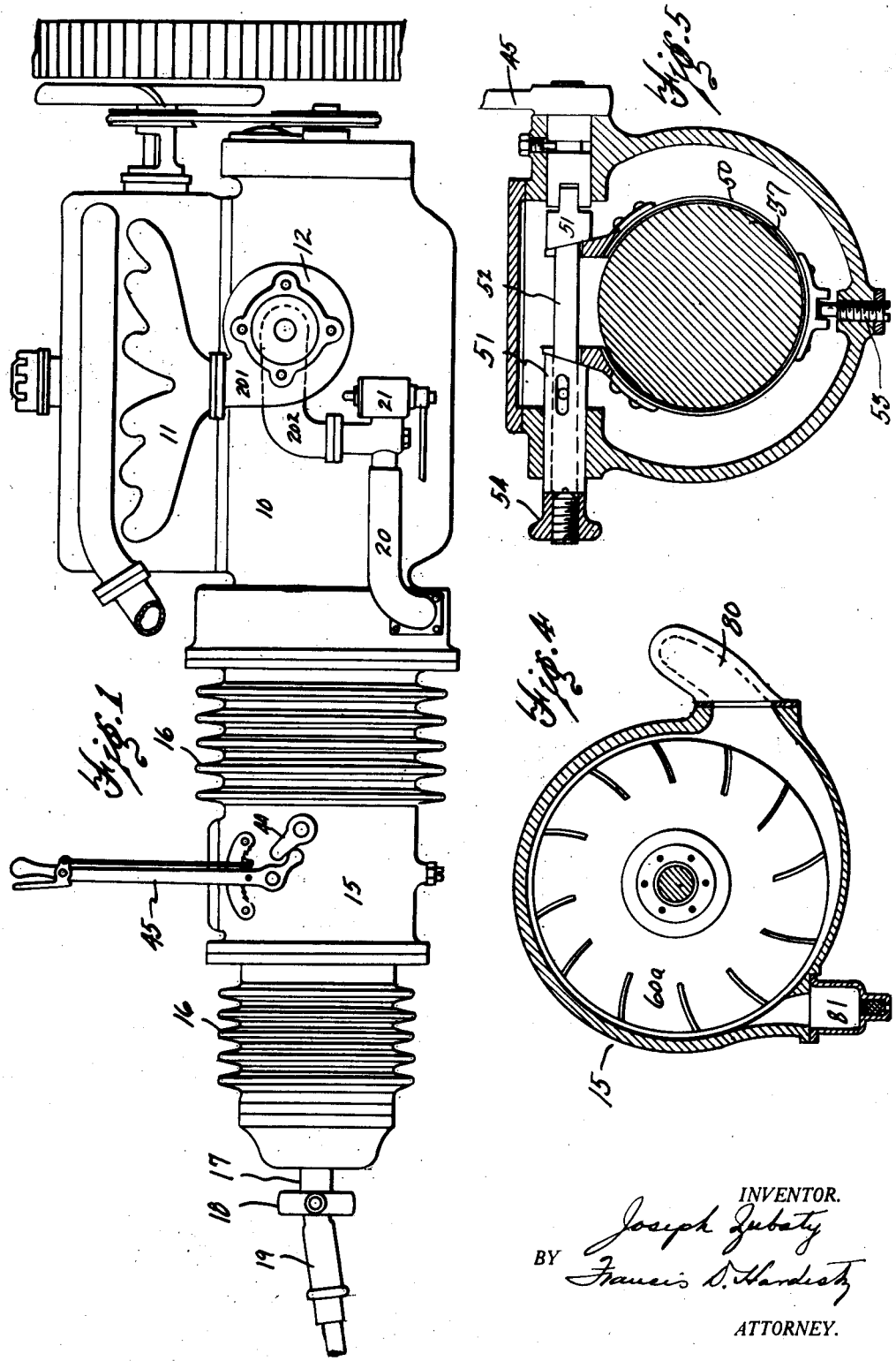

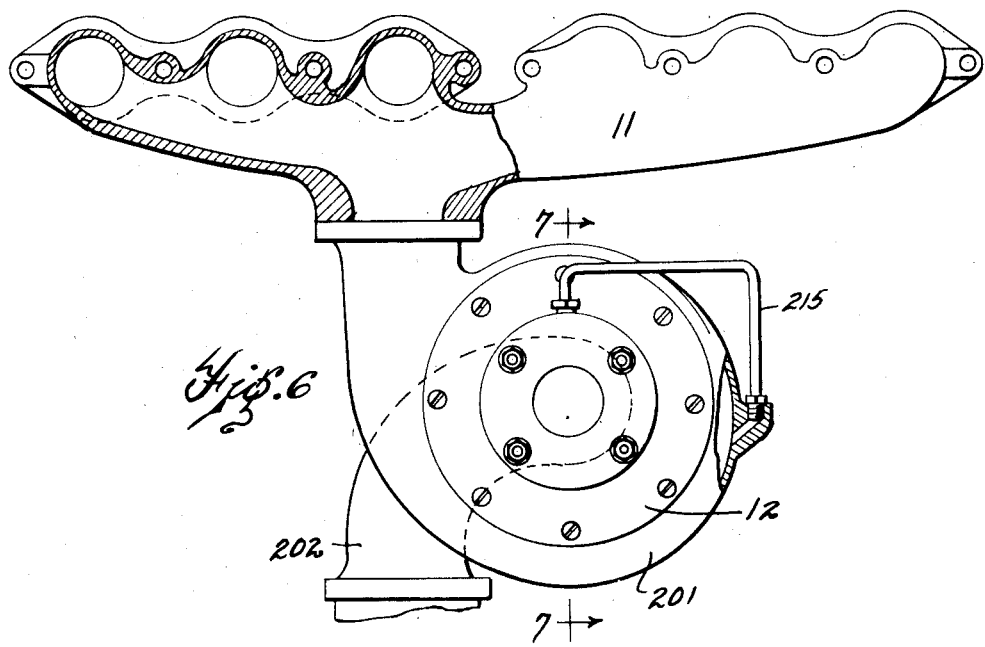
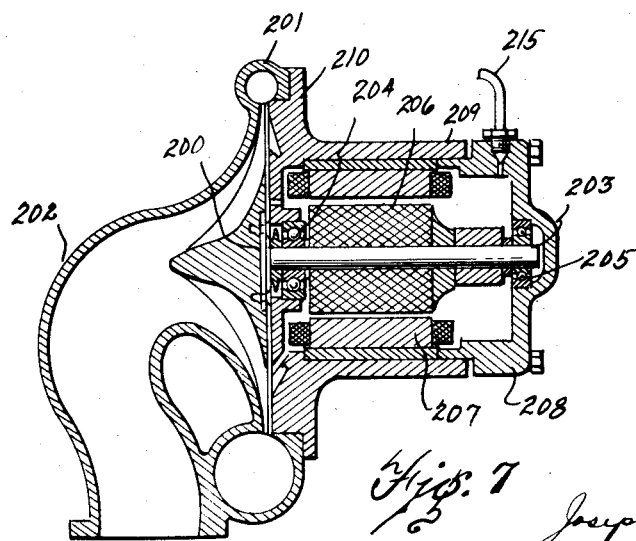

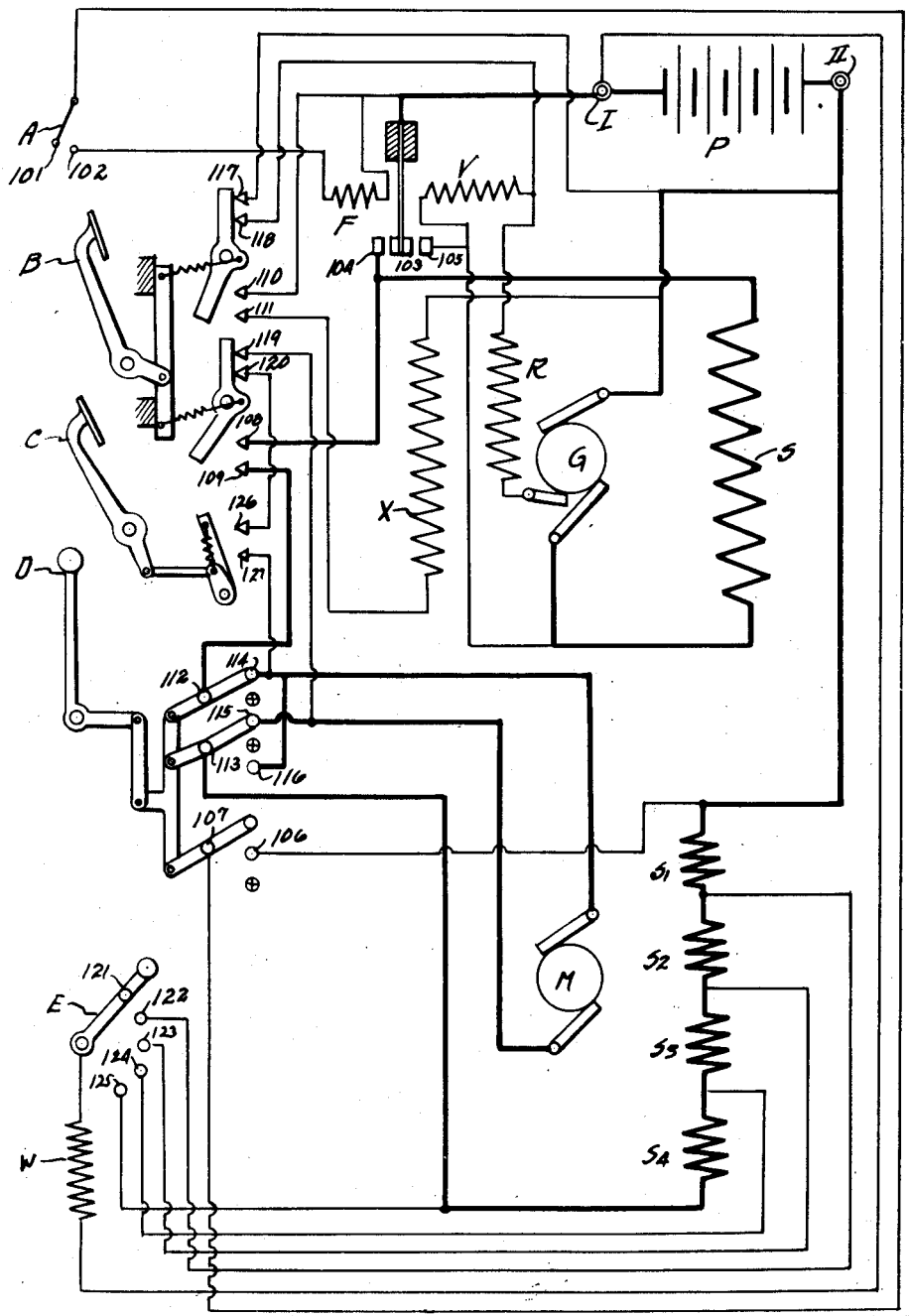

Patented July 1, 1930

1,769,281

UNITED STATES PATENT OFFICE

JOSEPH ZUBATY, OF FLINT, MICHIGAN

ELECTRIC TRANSMISSION

Application filed July 2, 1926. Serial No. 120,040.

The present invention relates to transmission of power and specifically to electric power transmissions for automotive vehicles.

Among the objects of the invention is a unit transmission, clutch, and brake which may be substituted for the present flywheel, clutch, and gear transmission and which will be noiseless, simpler in construction and operation and more flexible than the present construction.

Another object is to improve the operation of the engine driving the device by improving the condition of the fuel mixture as a function of the transmission.

Other objects will readily appear to those skilled in the art upon reference to the following description and accompanying drawings in which:

Fig. 1, is a side elevation of an automotive "power plant" involving the present invention.

Fig. 2, is a vertical longitudinal section of the upper half of one form of the transmission unit.

Fig. 3, is a similar view of a slightly modified form of the transmission unit.

Fig. 4, is a vertical section on the line 4—4 of Fig. 3.

Fig. 5, is a section on line 5—5 of Fig. 2.

Fig. 6, is an enlarged side elevation of the manifold and supercharger for the engine.

Fig. 7, is a section on line 7—7 of Fig. 6.

Fig. 8, is a wiring diagram showing the electrical connections for the various parts and controls.

In the drawings, 10 indicates an internal combustion engine, conventional in most respects but provided with a multibranch intake manifold 11 into which discharges a supercharging device 12 (described more in detail later).

At the rear end of motor 10 is a housing 15, preferably provided with cooling ribs 16, which housing contains the motor and generator constituting the main elements of the transmission, and this housing and its contained elements are connected directly to the engine as will be described. Extending from the rear of the housing 15 is a drive shaft 17, connected through the usual universal joint 18 to the propeller shaft 19 of the vehicle. Also, extending from the case is a conduit 20 leading to the air intake of the carburetor 21.

Coming now to the elements within housing 15, these are shown best in Figs. 2 and 3. As shown in these figures, they are mounted upon the inside of housing 15 the stator windings 25 and 26 of a generator and motor respectively whose rotors 27 and 28, are carried upon separate shafts 29 and 30 respectively (in Fig. 2) and $29^a$ and $30^a$, respectively (in Fig. 3). In the constructions shown in both of these figures, the generator shaft is fixed to a flange 31 by means of which it is secured directly to the crank shaft 32 of the engine 10, so that the generator rotor turns always with the engine shaft and, as one of its functions, serves as the flywheel for the engine.

In Fig. 2, the shafts 29 and 30 are shown as solid axially aligned shafts, the former being provided with a bearing 35 while in the enlarged end of the latter shaft 30 is a continuation of shaft 17 (Fig. 1). The enlarged end of shaft 30 is provided with a flange 36 to which is bolted a drum 37 serving as a brake drum and as one member of a disc clutch. The clutch discs or plates 38 are splined in the drum 37 and cooperate with plates or discs 39 splined to shaft 29. These plates 38 and 39 are pressed together by a spring 40 through sleeve 42 and levers 41. Sleeve 42 is movable to relieve the spring pressure through the action of a fork 43 connected to a short lever 44 coacting with a second hand lever 45 operating the brake 46 on drum 37. These parts are preferably so arranged that on moving lever 45, the clutch is first released without applying the brake, and on further movement the brake is applied. An end view of the brake is shown in Fig. 5. It consists of a brake band 50 whose ends are forced together by cams 51 carried by shaft 52 secured to lever 45. There is preferably means, such as pin 53, in the bottom of the case 15 to prevent turning of the band 50 with the drum and adjusting means is indicated at 54.

In Fig. 2, the clutch described is interposed between the generator and motor. Ahead of the generator, and carried by shaft 29, preferably by bolting between elements 31 and 32, is a fan 60 which may be of any suitable type but is shown as an ordinary flat bladed centrifugal fan, having a peripheral discharge. The end of casing 15 opposite the fan 60 will be closed except for screwed openings (not shown in Fig. 2) so that cool air will be drawn through the casing over the motor and generator to cool them. The air thus heated will be discharged through conduit 20 to the carburetor 21.

The form of device shown in Fig. 3 is essentially the same as that of Fig. 2. In this form, however, the generator rotor will be carried on a hollow shaft $29^a$ supported at its forward end in a bearing 70 carried in case 15 and at its rearward end in bearing 71 carried by the motor rotor 28. The forward end of shaft $29^a$ is provided with flange 72 to which is secured the drum 73 carrying discs 74 coacting with discs 75 splined on the end of shaft $30^a$. Drum 73 is also secured through its cover plate 74 to the short shaft 75 forming in effect a continuation of shaft $29^a$. Shaft 75 carries a sleeve 76 which is spring pressed toward the clutch and through levers 77 serves to press the plates together and thereby mechanically connect the generator and motor.

In this form of the transmission, the fan $60^a$ is carried by shaft $29^a$ midway of the housing 15 and draws air in at both ends of the housing through screens 79, discharging through conduit 80. As such fans have more or less of a centrifugal separating action, a dirt pocket is shown at 81 to allow any dirt separated by the fan to collect therein and not pass out of the conduit 80 to the engine.

As indicated in the wiring diagram (described in detail later) the transmission will be used in connection with a storage battery and the generator is so wound as to be capable of serving as a starting motor for the engine. This is readily accomplished by disconnecting the clutch between the generator and motor and closing the proper circuits to operate the generator as a motor. After the engine is in operation, the circuits are rearranged so that the generator again operates as a generator. The circuits are then arranged to connect the generator to the motor with the clutch still disengaged. The engine torque will then be transmitted to the rear wheels and the vehicle started. At a suitable speed, say about 20 miles per hour, the clutch is engaged and the motor current shut off. This makes a direct mechanical connection between the engine and the propellor shaft and the operation of the vehicle will be as with the present conventional type when in high gear.

In carrying out these operations, the main controls used will be the starting switch, the clutch pedal and the reversing switch control. The latter will have three positions "forward", "neutral" and "backward" or reverse. There will also be a suitable mechanical connection (not shown) between the clutch pedal and the reversing switch control so that when the latter is in "neutral", the clutch will be disengaged, permitting the engine "idle". Further, the clutch pedal will also operate a switch connecting the generator with the motor electrically during starting of the vehicle. The connection between the clutch pedal and the switch control lever will be such that, when the former is operated, corresponding switches are operated as well as the clutch but, when the clutch is operated by moving the switch control lever to neutral, the said switches are not operated.

Referring now to the wiring diagram, Fig. 8, A represents the starting switch, and B the clutch pedal having two switches connected thereto. These two switches are arranged to connect the points 117—118 and 119—120 when the clutch pedal is "out" i. e. when the clutch is engaged, and to connect 110—111 and 108—109 when it is "in," or engaged.

D is the reversing switch lever, G is the generator shown as having three windings S, R and X. S is a low resistance series winding, R is a self regulating winding working on the well known third brush principle, and X is the excitation winding.

M is the motor having preferably a low resistance series winding $S^1$, $S^2$, $S^3$, $S^4$. P is a storage battery, preferably a high voltage battery, having the terminals I and II and on these are connected whatever accessories are being used.

The operation of the device is as follows:—

To start the engine after the ignition switch (not shown) has been turned on, and with the lever D in its neutral position, i. e. when contacts 106 and 107 are made, the contacts 101—102 are connected, thereby energizing relay F through I, 101, 102, 107, 106 and II, and closing contacts 103—104 and establishing a circuit from terminal I of the battery P through the contacts 103—104, series winding S, and the armature of the generator G to the second battery terminal II. The generator G then acts as a powerful motor to crank the engine. In the circuit of the relay coil F there is a safety contact operated by the switch lever D which permits closing of contacts 103—104 only when this lever is in neutral position and the clutch therefore disconnected. This safety contact is shown at 106—107. This arrangement provides against starting the motor when the clutch is engaged or when the lever D is in either "forward" or "reverse" position.

Although the generator G is so wound as to be an efficient generator it will be sufficiently large to be used as a starting motor when occasion requires. When the engine is operating contacts 101—102 are opened.

In order to put the vehicle in motion, the operator then presses down the clutch pedal B. This disengages the clutch and breaks contacts 117—118 and 119—120 and makes contacts 110—111 and 108—109. He then moves lever D to "forward" or "reverse" position as he desires and makes the contacts 112—114 and 113—115 as in the diagram for "forward" or 112—115 and 113—116 for "reverse".

These operations connect the generator G and motor M electrically thru I, 110, 111, E, G, S, 108, 109, 112, 114, M, 115, 113, $S^4$, $S^3$, $S^2$, $S^1$, and II, to drive the propeller shaft and establish a magnetic field in the generator G regardless of speed.

With the clutch pedal down and the lever D in position as stated the operator accelerates the engine by increasing the fuel thereto in the usual manner thus increasing the speed of the generator G. Current will then be generated in the armature of G, pass through the series winding S, contacts 108—109, contacts 112—114 (or 112—115), the motor armature, windings $S^1$, $S^2$, $S^3$, and $S^4$ and back to the other side of the generator as above stated. This circuit shown in heavy lines in the diagram will have low resistance and therefore both voltage and amperage will depend largely upon the R. P. M. of the generator G. In other words, the faster the engine speed and therefore the generator speed, the greater the current and therefore the greater the torque exerted by the motor M.

When the vehicle is in motion and has been accelerated to a suitable speed, say 12 to 20 miles per hour, the clutch is slowly engaged by allowing the pedal B to be released and at the same time the engine accelerator is released. This slows down the engine, disconnects the generator G from motor M electrically and connects the latter mechanically to the engine, so that there is then direct drive from the engine to the propeller shaft. The vehicle is then operated in the conventional manner.

When the clutch pedal is released and the clutch engaged, the contacts 110—111 and 108—109 are opened and contacts 117—118 and 119—120 are closed. This disconnects the coil X and also the main generator-motor connection through 108—109. Closing contacts 117—118 puts the self-regulating winding R into action. This winding operates on the third brush principle to keep the generator voltage constant for charging the battery P, and in order to avoid discharge of the battery into the generator at low speeds or stops of the latter a voltage coil V is provided which connects contacts 103—105 only when the voltage of the circuit is high enough to secure positive flow of current. In this way, the generator G acts in the same manner as the conventional generator used on automotive vehicles.

In addition to the functions described, there is also a braking function which is accomplished through the use of the controller E and the windings $S^1$, $S^2$, $S^3$, and $S^4$, as follows: The controller lever 121 is connected to terminal I of the battery P while the contacts 122, 123, 124, and 125 are connected to the ends of the coil portions $S^1$, $S^2$, $S^3$, and $S^4$ respectively. Making contact between lever 121 and the contacts 122, 123, 124 and 125 progressively, therefore connects the battery P through the coil $S^1$, then coils $S^1$ and $S^2$, then $S^1$, $S^2$, and $S^3$, then $S^1$, $S^2$, $S^3$ and $S^4$ thus progressively increasing the loading of the motor which then becomes a generator upon pressing brake lever C and closing contacts 126—127, the contacts 119—120 being closed by the clutch pedal, to short circuit the armature of the motor. It is intended that this electric braking action shall be in addition to mechanical brakes operated either by the same pedal or another and will be most useful on long hills where the brakes are apt to be burned out. The arrangement shown does not permit the electric brake to be used when the clutch is disengaged and the generator and motor connected electrically. This is necessary to avoid a short circuit through 114—127—126—120—119—115.

In the installation above described, the generator will necessarily have several times the capacity of the ordinary automobile generator and it is therefore highly desirable to utilize the output in other ways in addition to battery charging. One of the means of utilization of the current is shown in Figs. 1, 6, and 7. In these figures, there is shown a second step supercharger 12 interposed between the carburetor 21 and the manifold 11. This supercharger consists of the impeller 200 mounted for high speed rotation within the stationary snail 201 discharging into the manifold 11, the intake being axial of and to the central portion of the impeller 200 through conduit 202.

Impeller 200 is carried upon a shaft 203 mounted in suitable anti-friction bearings 204 and 205 which shaft also carries the rotor 206 of a high speed electric motor. The stator 207 of the motor will be mounted within a cup shaped housing 208 which carries bearing 205 in its rearward end and which slides into a sleeve 209 closed at its forward end except for a suitable opening for shaft 203. This sleeve member is flanged at its forward end as at 210 and carries the bearing 204 for the shaft. Snail 201 will preferably be faced for the reception of flange 210 so that the motor, housing, and impeller may be bolted thereon as a unit. The motor housing will preferably be made of a metal of high heat conductivity, such as aluminum, and, being secured in close contact with the snail the heat of the motor will be conducted to the snail walls and assist in vaporization of the fuel.

In order to insure the absence of fuel air mixture in the motor housing, it is preferred to connect the latter by means of a small pipe 215 to the snail 201, opening into the latter in the direction of flow as indicated so that a slight suction will exist in said housing.

Further, as shown, the supercharger 12 will preferably be used with a manifold 11 of such form that any liquid fuel deposited on the walls thereof will run back into the supercharger housing and be again picked up by the gas stream and carried into the cylinders in finely divided condition.

Now, having described the invention and the preferred forms of embodiment thereof it should be noted that the said invention is not to be limited to the specific details described and illustrated but only by the scope of the claims which follow.

I claim:—

1. In an electric transmission unit for internal combustion engine propelled vehicles, an electric generator driven by the engine, an electric motor for driving the vehicle and receiving electric current from said generator, means for connecting said generator and motor mechanically and at the same time disconnecting them electrically, whereby said vehicle is driven directly by said engine, and means for operating said motor as a generator while mechanically connected to said engine whereby a braking action is exerted on said vehicle.

2. In an electric transmission unit for internal combustion engine propelled vehicles, an electric generator driven by the engine, an electric motor for driving the vehicle and receiving electric current from said generator, means for connecting said generator and motor mechanically and at the same time disconnecting them electrically whereby said vehicle may be driven directly by said engine, means for operating said motor as a generator while mechanically connected to said engine whereby a breaking action may be exerted on said vehicle, a mechanical brake for said vehicle operatively connected to said last mentioned means and means preventing attempted use of said electric braking when the motor and generator are connected electrically.

3. In combination with an engine, an electric transmission unit including a generator having a rotor, a hollow shaft, upon which the rotor is mounted, means connecting said engine and said generator including one member of a clutch, a motor in axial alignment with said generator and having a rotor, a shaft upon which said motor rotor is mounted and extending through said hollow shaft to the connecting means, another member of said clutch being carried by said motor shaft, means for actuating said clutch whereby to connect and disconnect the two shafts, an engine housing and a housing for the several elements the stators of the motor and generator being carried in said last mentioned housing, the latter being connected to the housing of said engine.

JOSEPH ZUBATY.